(12) United States Patent
Kusafuka (10) Patent No.: US 11,849,103 B2
(45) Date of Patent: Dec. 19, 2023

(54) IMAGE DISPLAY MODULE, IMAGE DISPLAY SYSTEM, MOVABLE OBJECT, IMAGE DISPLAY METHOD, AND NON-TRANSITORY COMPUTER-READABLE MEDIUM STORING IMAGE DISPLAY PROGRAM

(71) Applicant: KYOCERA Corporation, Kyoto (JP)

(72) Inventor: Kaoru Kusafuka, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 272 days.

(21) Appl. No.: 17/442,032

(22) PCT Filed: Mar. 16, 2020

(86) PCT No.: PCT/JP2020/011526
§ 371 (c)(1),
(2) Date: Sep. 22, 2021

(87) PCT Pub. No.: WO2020/196052
PCT Pub. Date: Oct. 1, 2020

(65) Prior Publication Data
US 2022/0174262 A1 Jun. 2, 2022

(30) Foreign Application Priority Data
Mar. 26, 2019 (JP) .................. 2019-059289

(51) Int. Cl.
*H04N 13/31* (2018.01)
*H04N 13/383* (2018.01)
(Continued)

(52) U.S. Cl.
CPC ............. *H04N 13/31* (2018.05); *B60K 35/00* (2013.01); *G02B 27/0101* (2013.01);
(Continued)

(58) Field of Classification Search
CPC .... H04N 13/31; H04N 13/312; H04N 13/315; H04N 13/317; H04N 13/32;
(Continued)

(56) References Cited

U.S. PATENT DOCUMENTS 5,825,541 A * 10/1998 Imai ..................... H04N 13/359
348/E13.058
2011/0032339 A1* 2/2011 Hirayama ............ H04N 13/111
348/51

(Continued)

FOREIGN PATENT DOCUMENTS

| JP | 2014-199385 A | 10/2014 |
|---|---|---|
| JP | 2019-015823 A | 1/2019 |
| WO | 2018/105534 A1 | 6/2018 |

*Primary Examiner* — Nathnael Aynalem
(74) *Attorney, Agent, or Firm* — Studebaker & Brackett PC (57) ABSTRACT

An image display module includes a display that displays a parallax image projected to eyes of a user, a barrier that causes parallax between the eyes by defining a traveling direction of image light for the parallax image, and a controller that controls the display. The controller divides the display into a plurality of display control areas based on distortion of the parallax image projected, and controls, for each of the plurality of display control areas, a minimum repeat unit and an index for the parallax image.

11 Claims, 8 Drawing Sheets

(51) Int. Cl.
  *H04N 13/363* (2018.01)
  *G02B 30/31* (2020.01)
  *B60K 35/00* (2006.01)
  *G02B 27/01* (2006.01)

(52) U.S. Cl.
  CPC ........... *G02B 30/31* (2020.01); *H04N 13/363* (2018.05); *H04N 13/383* (2018.05); *B60K 2370/149* (2019.05); *B60K 2370/1529* (2019.05); *G02B 2027/011* (2013.01); *G02B 2027/014* (2013.01); *G02B 2027/0134* (2013.01); *G02B 2027/0187* (2013.01)

(58) Field of Classification Search
  CPC .. H04N 13/363; H04N 13/383; H04N 13/366; H04N 13/279; H04N 13/225; H04N 13/204; B60K 2370/149; B60K 2370/1529; B60K 2370/1531; B60K 2370/334; B60K 2370/23; B60K 2370/31; B60K 2370/785; G02B 30/30; G02B 2027/0134; G02B 27/0101; G02B 27/01; G02B 30/31; G02B 2027/011; G02B 2027/014; G02B 27/0172; G02B 30/28; G02B 30/27; G02B 30/32; G06T 2207/10012; G06T 5/006; G06T 7/70
  USPC .............................................. 348/42, 51, 54
  See application file for complete search history.

(56) References Cited

U.S. PATENT DOCUMENTS

2017/0168309 A1\* 6/2017 Kasazumi .................. B60J 1/02
2020/0074896 A1   3/2020 Kusafuka et al.

\* cited by examiner

IMAGE DISPLAY MODULE, IMAGE DISPLAY SYSTEM, MOVABLE OBJECT, IMAGE DISPLAY METHOD, AND NON-TRANSITORY COMPUTER-READABLE MEDIUM STORING IMAGE DISPLAY PROGRAM

FIELD

The present disclosure relates to an image display module, an image display system, a movable object, an image display method, and an image display program.

BACKGROUND

A known image display device for providing stereoscopic vision corrects distortion through an optical system (refer to, for example, Patent Literature 1).

The quality of a stereoscopic image provided to a user is to be improved further.

CITATION LIST

Patent Literature

Patent Literature 1: Japanese Unexamined Patent Application Publication No. 2019-15823

BRIEF SUMMARY

An image display module according to one embodiment of the present disclosure includes a display, a barrier, and a controller. The display displays a parallax image projected to a first eye and a second eye of a user through an optical system. The barrier causes parallax between the first eye and the second eye by defining a traveling direction of image light for the parallax image. The controller controls the display. The controller divides the display into a plurality of display control areas based on a degree of distortion of the parallax image projected through the optical system. The controller controls, for each of the plurality of display control areas, a minimum repeat unit and an index for the parallax image.

An image display system according to one embodiment of the present disclosure includes an imaging device and an image display module. The imaging device detects eye position information indicating positions of a first eye and a second eye of a user. The image display module includes a display, a barrier, and a controller. The display displays a parallax image projected to the first eye and the second eye of the user through an optical system. The barrier causes parallax between the first eye and the second eye by defining a traveling direction of image light for the parallax image. The controller controls the display based on the eye position information. The controller divides the display into a plurality of display control areas based on a degree of distortion of the parallax image projected through the optical system. The controller controls, for each of the plurality of display control areas, a minimum repeat unit and an index for the parallax image.

A movable object according to one embodiment of the present disclosure includes an image display system. The image display system includes an imaging device and an image display module. The imaging device detects eye position information indicating positions of a first eye and a second eye of a user. The image display module includes a display, a barrier, and a controller. The display displays a parallax image projected to the first eye and the second eye of the user through an optical system. The barrier causes parallax between the first eye and the second eye by defining a traveling direction of image light for the parallax image. The controller controls the display based on the eye position information. The controller divides the display into a plurality of display control areas based on a degree of distortion of the parallax image projected through the optical system. The controller controls, for each of the plurality of display control areas, a minimum repeat unit and an index for the parallax image. The movable object includes a windshield including a part of the optical system.

An image display method according to one embodiment of the present disclosure includes dividing, based on a degree of distortion of a parallax image projected to a first eye and a second eye of a user through an optical system, a display for displaying the parallax image into a plurality of display control areas. The image display method includes controlling, for each of the plurality of display control areas, a minimum repeat unit and an index for the parallax image.

An image display program according to one embodiment of the present disclosure is a program for causing a processor to perform an operation including dividing, based on a degree of distortion of a parallax image projected to a first eye and a second eye of a user through an optical system, a display for displaying the parallax image into a plurality of display control areas. The image display program causes the processor to perform an operation including controlling, for each of the plurality of display control areas, a minimum repeat unit and an index for the parallax image.

BRIEF DESCRIPTION OF DRAWINGS

The objects, features, and advantages of the present disclosure will become more apparent from the following detailed description and the drawings.

DETAILED DESCRIPTION

An embodiment of the present disclosure will now be described in detail with reference to the drawings. The drawings used herein are schematic and are not drawn to scale relative to the actual size of each component.

Figure 1:
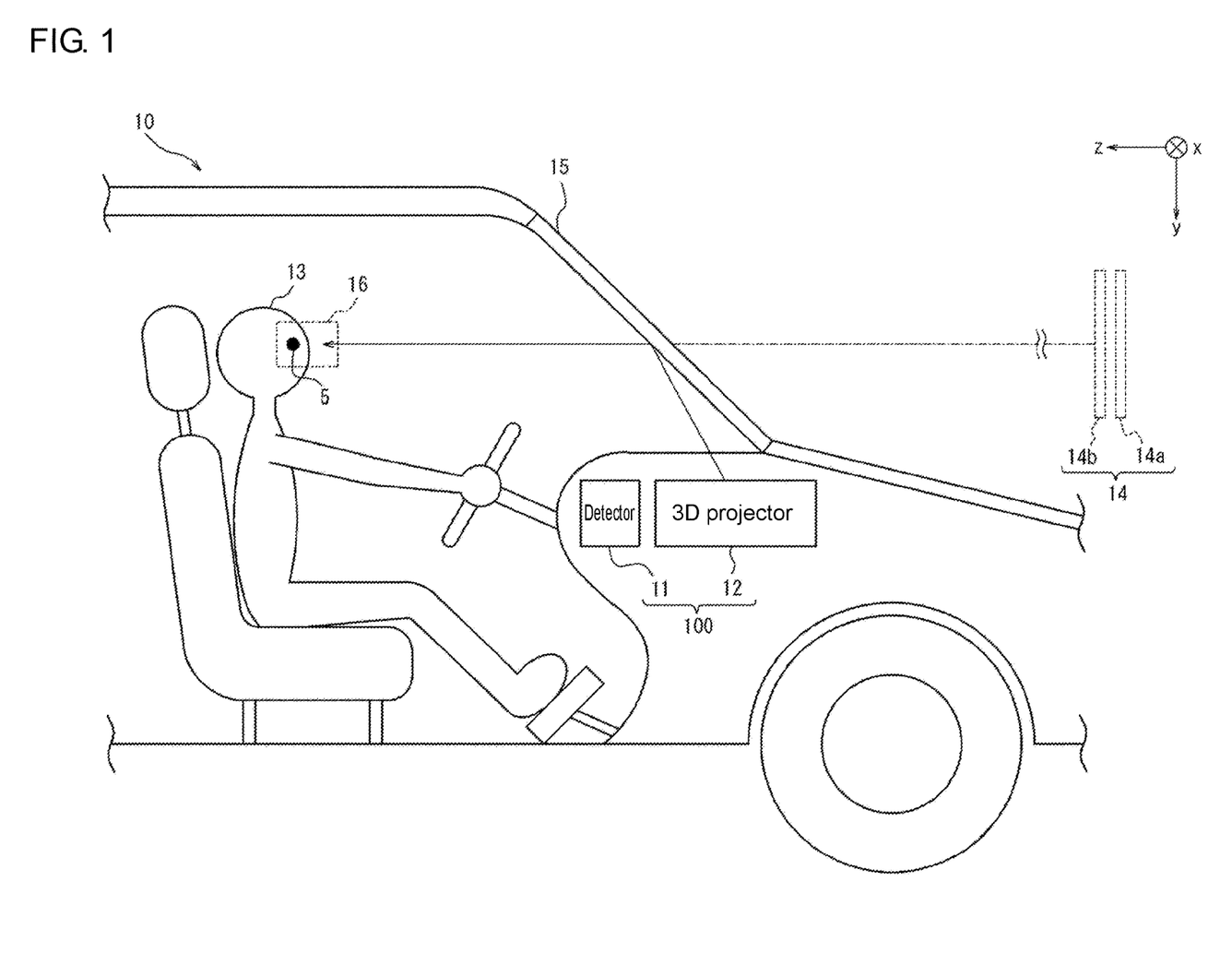
FIG. 1 is a schematic diagram of a movable object according to one embodiment of the present disclosure, showing an example structure.

As shown in FIG. 1, a movable object 10 according to one embodiment of the present disclosure includes a three-dimensional (3D) projection system 100 and an optical member 15. The 3D projection system 100 includes a 3D projector 12. The movable object 10 incorporates the 3D projection system 100 and the 3D projector 12. The 3D projection system 100 is also referred to as an image display system.

The 3D projector 12 may be at any position inside or outside the movable object 10. For example, the 3D projector 12 may be on a dashboard in the movable object 10. The 3D projector 12 emits image light toward the optical member 15.

The optical member 15 reflects image light emitted from the 3D projector 12. The image light reflected off the optical member 15 reaches an eye box 16. The eye box 16 is a region in real space in which eyes 5 of a user 13 are expected to be located based on, for example, the body shape, posture, and changes in the posture of the user 13. The eye box 16 may have any shape. The eye box 16 may include a planar or 3D region. The solid arrow in FIG. 1 indicates a path traveled by at least a part of image light emitted from the 3D projector 12 to reach the eye box 16. The path traveled by image light is also referred to as an optical path. With the eyes 5 of the user 13 located in the eye box 16 receiving image light, the user 13 can view a virtual image 14. The virtual image 14 is on the dot-and-dash line extending frontward from the path extending from the optical member 15 to the eyes 5. The 3D projector 12 can function as a head-up display that enables the user 13 to view the virtual image 14. The optical member 15 may include, for example, a windshield or a combiner. In the present embodiment, the optical member 15 is a windshield. In FIG. 1, the direction in which the eyes 5 of the user 13 are aligned corresponds to x-direction. The vertical direction corresponds to y-direction. A direction orthogonal to x-direction and y-direction corresponds to z-direction.

Examples of the movable object in the present disclosure include a vehicle, a vessel, and an aircraft. Examples of the vehicle include an automobile, an industrial vehicle, a railroad vehicle, a community vehicle, and a fixed-wing aircraft traveling on a runway. Examples of the automobile include a passenger vehicle, a truck, a bus, a motorcycle, and a trolley bus. Examples of the industrial vehicle include an agricultural vehicle and a construction vehicle. Examples of the industrial vehicle include a forklift and a golf cart. Examples of the agricultural vehicle include a tractor, a cultivator, a transplanter, a binder, a combine, and a lawn mower. Examples of the construction vehicle include a bulldozer, a scraper, a power shovel, a crane vehicle, a dump truck, and a road roller. Examples of the vehicle may include man-powered vehicles. The classification of the vehicle is not limited to the above examples. Examples of the automobile include an industrial vehicle travelling on a road. One type of vehicle may fall within a plurality of classes. Examples of the vessel include a jet ski, a boat, and a tanker. Examples of the aircraft include a fixed-wing aircraft and a rotary-wing aircraft.

The 3D projection system 100 may further include a detector 11 that detects the positions of the eyes 5 of the user 13. The detector 11 detects the positions of the eyes 5 of the user 13. The detector 11 outputs information about the detected positions of the eyes 5 to the 3D projector 12. The information about the detected positions of the eyes 5 is also referred to as eye position information. The 3D projector 12 may control, based on the positions of the eyes 5 of the user 13 detected by the detector 11, an image to be projected. The detector 11 may be at any position inside or outside the movable object 10. For example, the detector 11 may be on a dashboard in the movable object 10. The detector 11 may output, to the 3D projector 12, information about the positions of the eyes 5, for example, with wires, wirelessly, or through a controller area network (CAN).

The detector 11 may include an imaging device. The imaging device may include, for example, a charge-coupled device (CCD) image sensor or a complementary metal-oxide semiconductor (CMOS) image sensor. The imaging device can capture an image of the face of the user 13. The imaging range of the imaging device includes the eye box 16. The user 13 may include, for example, the driver of the movable object 10. The detector 11 may detect, based on a captured image generated with the imaging device, the positions of the two eyes of the user 13 in real space.

The detector 11 may include no imaging device, and may be connected to an imaging device. The detector 11 may include an input terminal for receiving a signal from the imaging device. In this case, the imaging device may be directly connected to the input terminal. The detector 11 may be indirectly connected to the input terminal with a shared network. The detector 11 may detect the positions of the eyes 5 of the user 13 based on an image signal received through the input terminal.

The detector 11 may include, for example, a sensor. The sensor may be, for example, an ultrasonic sensor or an optical sensor. The detector 11 may detect the position of the head of the user 13 with the sensor, and detect the positions of the eyes 5 of the user 13 based on the position of the head. The detector 11 may use two or more sensors to detect the positions of the eyes 5 of the user 13 as coordinates in 3D space.

Figure 2:
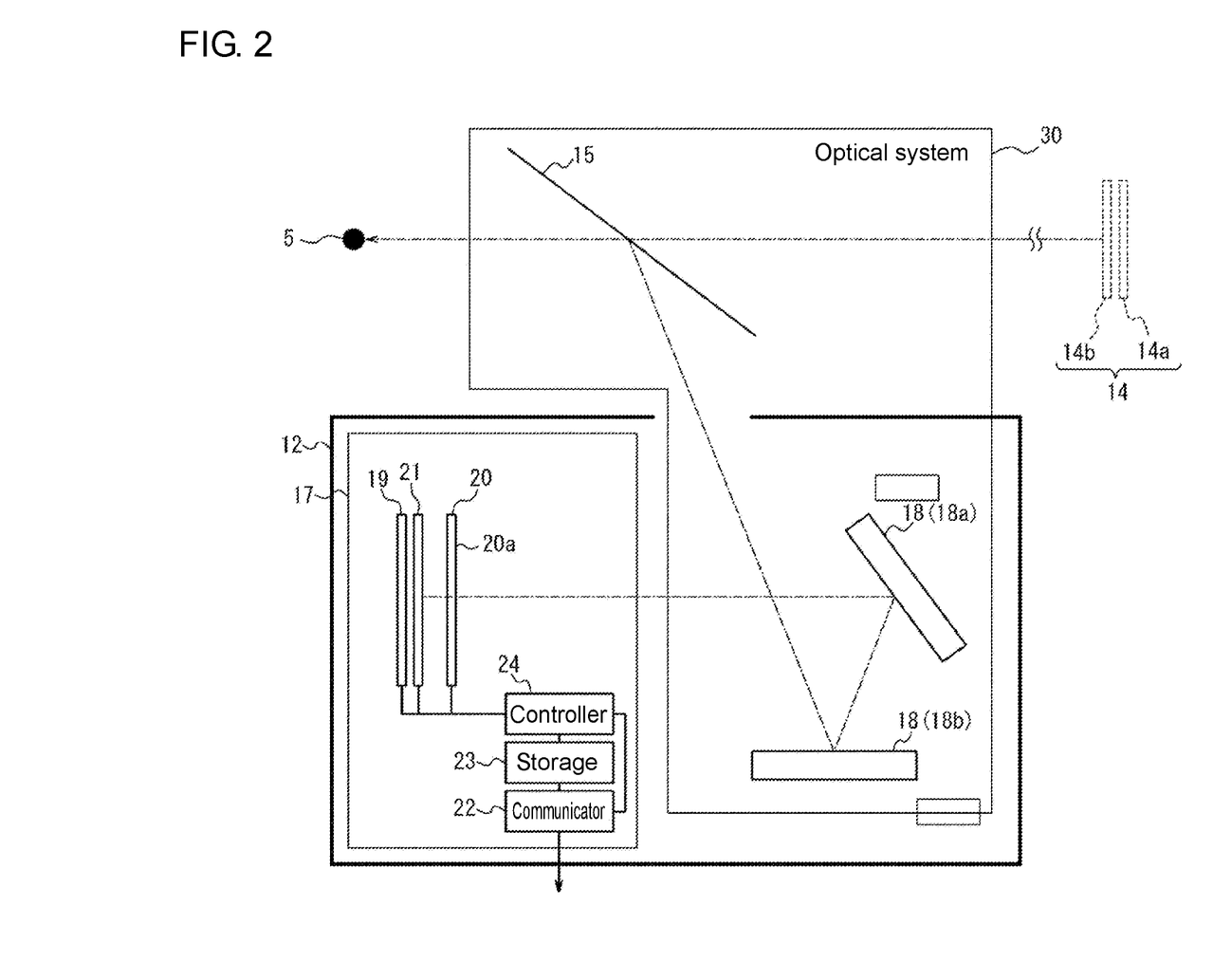
FIG. 2 is a schematic diagram of a three-dimensional projector in FIG. 1.

As shown in FIG. 2, the 3D projector 12 includes a 3D display device 17 and an optical element 18. The 3D projector 12 is also referred to as an image display module. The 3D display device 17 includes a backlight 19, a display 20 including a display surface 20a, a barrier 21, and a controller 24. The 3D display device 17 may further include a communicator 22. The 3D display device 17 may further include a storage 23.

The optical element 18 may include a first mirror 18a and a second mirror 18b. At least either the first mirror 18a or the second mirror 18b may have optical power. In the present embodiment, the first mirror 18a is a concave mirror having optical power. The second mirror 18b is a plane mirror. The optical element 18 may function as a magnifying optical system that magnifies an image displayed by the 3D display device 17. The dot-and-dash arrow in FIG. 2 indicates a path traveled by at least a part of image light emitted from the 3D display device 17 to be reflected off the first mirror 18a and the second mirror 18b and then exit the 3D projector 12. The image light that has exited the 3D projector 12 reaches the optical member 15, is reflected off the optical member 15, and then reaches the eyes 5 of the user 13. This allows the user 13 to view the image displayed by the 3D display device 17.

The optical element 18 and the optical member 15 allow image light emitted from the 3D display device 17 to reach the eyes 5 of the user 13. The optical element 18 and the optical member 15 may form an optical system 30. In other words, the optical system 30 includes the optical element 18 and the optical member 15. The optical system 30 allows image light emitted from the 3D display device 17 to travel along the optical path indicated by the dot-and-dash line and reach the eyes 5 of the user 13. The optical system 30 may control the traveling direction of image light to enlarge or reduce an image viewable by the user 13. The optical system 30 may control the traveling direction of image light to deform an image viewable by the user 13 based on a certain matrix.

The optical element 18 may have a structure different from the illustrated structure. The optical element 18 may include a concave mirror, a convex mirror, or a plane mirror. The concave mirror or the convex mirror may be at least partially spherical or aspherical. The optical element 18 may be one element or may include three or more elements, instead of two elements. The optical element 18 may include a lens instead of or in addition to a mirror. The lens may be a concave lens or a convex lens. The lens may be at least partially spherical or aspherical.

The backlight 19 is more away from the user 13 than the display 20 and the barrier 21 along the optical path. The backlight 19 emits light toward the barrier 21 and the display 20. At least a part of light emitted by the backlight 19 travels along the optical path indicated by the dot-and-dash line and reaches the eyes 5 of the user 13. The backlight 19 may include a light-emitting diode (LED) or a light emitter such as an organic electroluminescence (EL) element and an inorganic EL element. The backlight 19 may have any structure that allows control of the light intensity and the light intensity distribution.

The display 20 includes a display panel. The display 20 may be, for example, a liquid-crystal device such as a liquid-crystal display (LCD). In the present embodiment, the display 20 includes a transmissive liquid-crystal display panel. The display 20 is not limited to this, and may include any of various display panels.

The display 20 includes multiple pixels and controls the transmittance of light from the backlight 19 incident on each pixel to emit image light that then reaches the eyes 5 of the user 13. The user 13 views an image formed by image light emitted from each pixel in the display 20.

The barrier 21 defines the traveling direction of incident light. With the barrier 21 nearer the backlight 19 than the display 20 along the optical path, light emitted from the backlight 19 enters the barrier 21 and then enters the display 20. In this case, the barrier 21 blocks or attenuates a part of light emitted from the backlight 19 and transmits another part of the light to the display 20. The display 20 emits incident light traveling in a direction defined by the barrier 21 as image light traveling in the same direction. With the display 20 nearer the backlight 19 than the barrier 21 along the optical path, light emitted from the backlight 19 enters the display 20 and then enters the barrier 21. In this case, the barrier 21 blocks or attenuates a part of image light emitted from the display 20 and transmits another part of the image light to the eyes 5 of the user 13.

Irrespective of whether the display 20 or the barrier 21 is nearer the user 13, the barrier 21 can control the traveling direction of image light. The barrier 21 allows a part of image light emitted from the display 20 to reach one of the left eye 5L and the right eye 5R (refer to FIG. 5) of the user 13, and another part of the image light to reach the other one of the left eye 5L and the right eye 5R of the user 13. In other words, the barrier 21 directs at least a part of image light toward the left eye 5L of the user 13 and toward the right eye 5R of the user 13. The left eye 5L is also referred to as a first eye, and the right eye 5R as a second eye. In the present embodiment, the barrier 21 is located between the backlight 19 and the display 20. In other words, light emitted from the backlight 19 first enters the barrier 21 and then enters the display 20.

The barrier 21 defines the traveling direction of image light to allow each of the left eye 5L and the right eye 5R of the user 13 to receive different image light. Each of the left eye 5L and the right eye 5R of the user 13 can thus view a different image.

Figure 3:
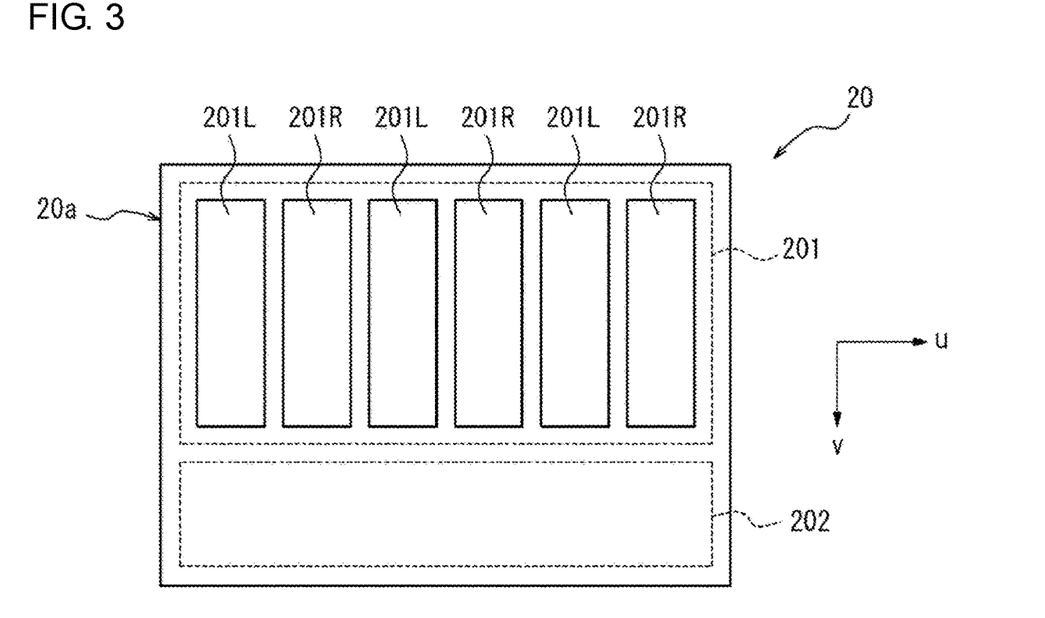
FIG. 3 is a plan view of a display surface showing its example structure.

As shown in FIG. 3, the display 20 includes, on the display surface 20a, a first display area 201 and a second display area 202. The first display area 201 includes left-eye viewing areas 201L viewable by the left eye 5L of the user 13 and right-eye viewing areas 201R viewable by the right eye 5R of the user 13. The display 20 displays a parallax image including left-eye images viewable by the left eye 5L of the user 13 and right-eye images viewable by the right eye 5R of the user 13. A parallax image refers to an image projected to the left eye 5L and the right eye 5R of the user 13 to cause parallax between the two eyes of the user 13. The display 20 displays left-eye images on the left-eye viewing areas 201L and right-eye images on the right-eye viewing areas 201R. In other words, the display 20 displays a parallax image on the left-eye viewing areas 201L and the right-eye viewing areas 201R. The left-eye viewing areas 201L and the right-eye viewing areas 201R are arranged in u-direction indicating a parallax direction. The left-eye viewing areas 201L and the right-eye viewing areas 201R may extend in v-direction orthogonal to the parallax direction, or in a direction inclined with respect to v-direction at a certain angle. In other words, the left-eye viewing areas 201L and the right-eye viewing areas 201R may be arranged alternately in a certain direction including a component in the parallax direction. The pitch between the alternately arranged left-eye viewing areas 201L and right-eye viewing areas 201R is also referred to as a parallax image pitch. The left-eye viewing areas 201L and the right-eye viewing areas 201R may be spaced from each other or adjacent to each other. The display 20 displays a planar image on the second display area 202. A planar image causes no parallax between the eyes 5 of the user 13 and is not viewed stereoscopically.

Figure 4:
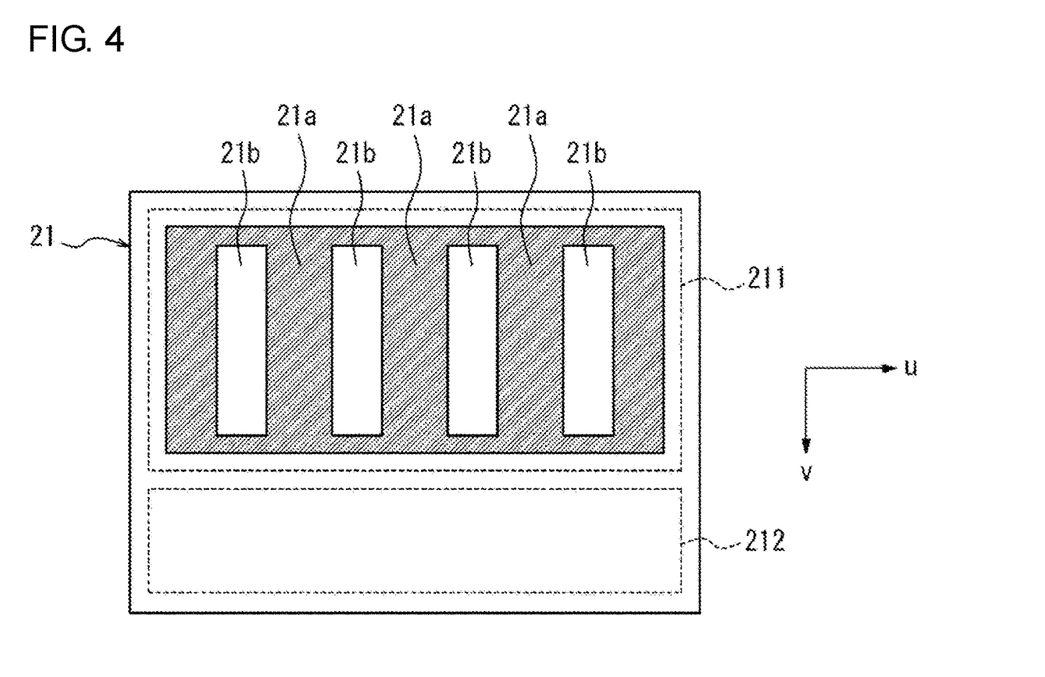
FIG. 4 is a plan view of a barrier showing its example structure.

As shown in FIG. 4, the barrier 21 includes a first barrier area 211 and a second barrier area 212. The barrier 21 located nearer the user 13 than the display 20 along the optical path controls the transmittance of image light emitted from the display 20. The first barrier area 211 corresponds to the first display area 201, and controls the transmittance of image light for a parallax image emitted from the first display area 201. The first barrier area 211 includes open areas 21b and light-blocking surfaces 21a. The open areas 21b transmit light entering the barrier 21 from the display 20. The open areas 21b may transmit light with a transmittance of a first certain value or greater. The first certain value may be, for example, 100% or a value close to 100%. The light-blocking surfaces 21a block light entering the barrier 21 from the display 20. The light-blocking surfaces 21a may transmit light with a transmittance of a second certain value or smaller. The second certain value may be, for example, 0% or a value close to 0%. The first certain value is greater than the second certain value.

The open areas 21b and the light-blocking surfaces 21a are arranged alternately in u-direction indicating the parallax direction. The boundaries between the open areas 21b and the light-blocking surfaces 21a may extend in v-direction orthogonal to the parallax direction as shown in FIG. 4, or in a direction inclined with respect to v-direction at a certain angle. In other words, the open areas 21b and the light-blocking surfaces 21a may be arranged alternately in a certain direction including a component in the parallax direction.

The shapes of the open areas 21b and the light-blocking surfaces 21a may be determined based on the shapes of the left-eye viewing areas 201L and the right-eye viewing areas 201R. Conversely, the shapes of the left-eye viewing areas 201L and the right-eye viewing areas 201R may be determined based on the shapes of the open areas 21b and the light-blocking surfaces 21a.

The second barrier area 212 corresponds to the second display area 202, and controls the transmittance of image light for a planar image emitted from the second display area 202. The second barrier area 212 transmits light entering the barrier 21 from the display 20. The second barrier area 212 may transmit light with a transmittance of a third certain value or greater. The third certain value may be, for example, 100% or a value close to 100%.

In the present embodiment, the barrier 21 is more away from the user 13 than the display 20 along the optical path. The barrier 21 controls the transmittance of light directed from the backlight 19 to the display 20. The open areas 21b transmit light directed from the backlight 19 to the display 20. The light-blocking surfaces 21a block light directed from the backlight 19 to the display 20. This structure allows light entering the first display area 201 to travel in a certain direction. Thus, the barrier 21 can control a part of image light to reach the left eye 5L of the user 13, and another part of the image light to reach the right eye 5R of the user 13.

The barrier 21 may include a liquid crystal shutter. The liquid crystal shutter can control the transmittance of light in accordance with a voltage applied. The liquid crystal shutter may include multiple pixels and control the transmittance of light for each pixel. A liquid crystal shutter can form an area with high light transmittance or an area with low light transmittance in an intended shape. The open areas 21b in the barrier 21 including a liquid crystal shutter may have a transmittance of the first certain value or greater. The light-blocking surfaces 21a in the barrier 21 including a liquid crystal shutter may have a transmittance of the second certain value or smaller. The first certain value may be greater than the second certain value. The ratio of the second certain value to the first certain value may be set to 1/100 in one example. The ratio of the second certain value to the first certain value may be set to 1/1000 in another example. The barrier 21 including the open areas 21b and the light-blocking surfaces 21a that can deform is also referred to as an active barrier.

The controller 24 controls the display 20. The controller 24 may control the barrier 21 that is an active barrier. The controller 24 may control the backlight 19. The controller 24 may obtain, from the detector 11, information about the positions of the eyes 5 of the user 13, and control the display 20, the barrier 21, or the backlight 19 based on the information. The controller 24 may be, for example, a processor. The controller 24 may include one or more processors. The processors may include a general-purpose processor that reads a specific program to perform a specific function, and a processor dedicated to specific processing. The dedicated processor may include an application-specific integrated circuit (ASIC). The processor may include a programmable logic device (PLD). The PLD may include a field-programmable gate array (FPGA). The controller 24 may be a system-on-a-chip (SoC) or a system in a package (SiP) in which one or more processors cooperate with other components.

The communicator 22 may include an interface that can communicate with an external device. The external device may include, for example, the detector 11. The communicator 22 may obtain information from the detector 11 and output the information to the controller 24. The interface that can perform communication in the present disclosure may include, for example, a physical connector and a wireless communication device. The physical connector may include an electric connector for transmission with electric signals, an optical connector for transmission with optical signals, and an electromagnetic connector for transmission with electromagnetic waves. The electric connector may include a connector complying with IEC 60603, a connector complying with the universal serial bus (USB) standard, or a connector used for an RCA terminal. The electric connector may include a connector used for an S terminal specified by EIAJ CP-121aA or a connector used for a D terminal specified by EIAJ RC-5237. The electric connector may include a connector complying with the High-Definition Multimedia Interface (HDMI, registered trademark) standard or a connector used for a coaxial cable including a British Naval Connector, also known as, for example, a Baby-series N Connector (BNC). The optical connector may include a connector complying with IEC 61754. The wireless communication device may include a wireless communication device complying with the Bluetooth (registered trademark) standard and a wireless communication device complying with other standards including IEEE 8021a. The wireless communication device includes at least one antenna.

The storage 23 may store various information sets or programs for causing the components of the 3D display device 17 to operate. The storage 23 may include, for example, a semiconductor memory. The storage 23 may function as a work memory for the controller 24. The controller 24 may include the storage 23.

Figure 5:
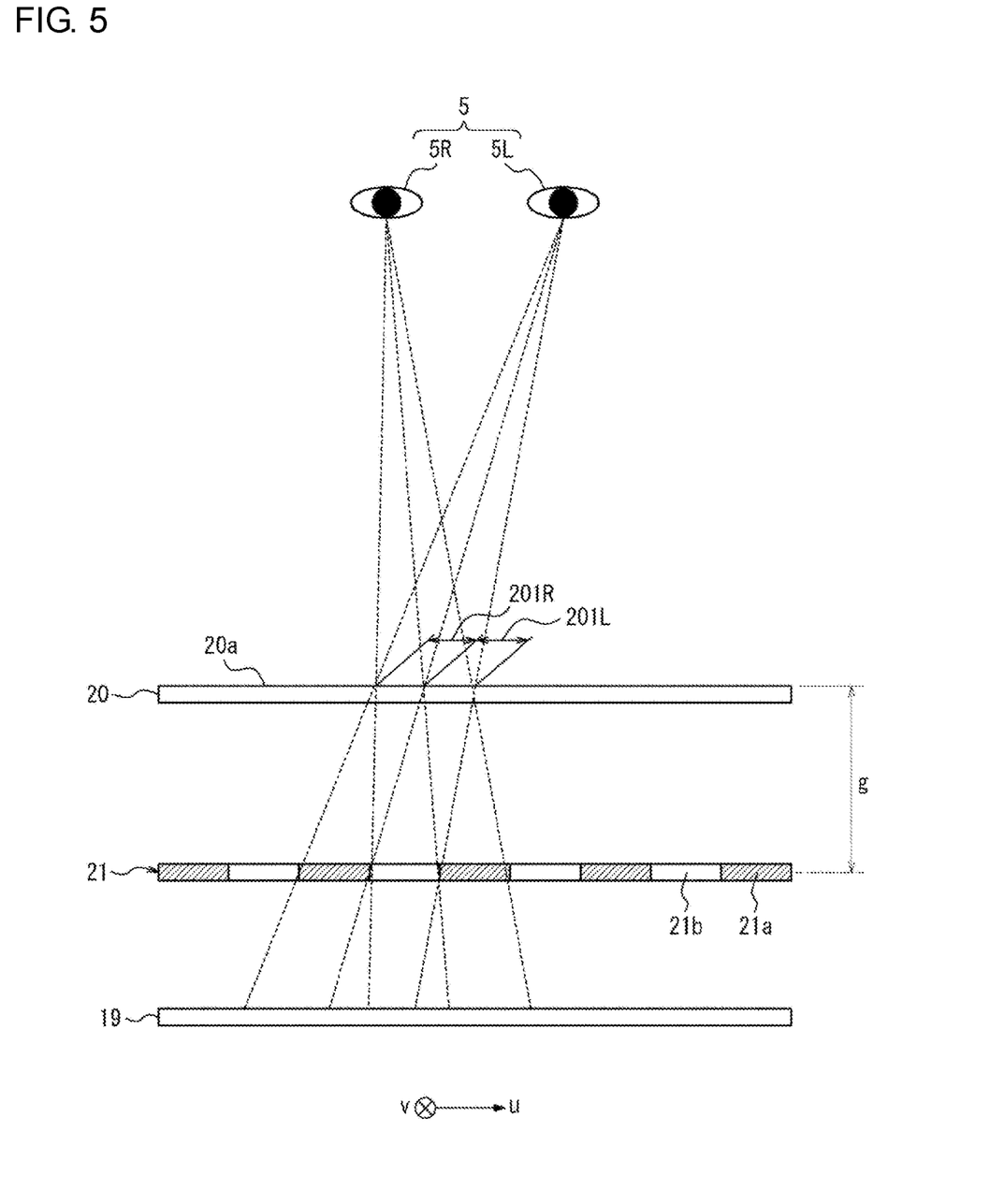
FIG. 5 is a schematic diagram describing the relationship between the eyes of a user, a display, and the barrier.

As shown in FIG. 5, light emitted from the backlight 19 passes through the barrier 21 and the display 20 to reach the eyes 5 of the user 13. The broken lines indicate the paths traveled by light from the backlight 19 to reach the eyes 5. The light through the open areas 21b in the barrier 21 to reach the right eye 5R passes through the right-eye viewing areas 201R in the display 20. In other words, light through the open areas 21b allows the right eye 5R to view the right-eye viewing areas 201R. The light through the open areas 21b in the barrier 21 to reach the left eye 5L passes through the left-eye viewing areas 201L in the display 20. In other words, light through the open areas 21b allows the left eye 5L to view the left-eye viewing areas 201L.

The display 20 displays left-eye images on the left-eye viewing areas 201L and right-eye images on the right-eye viewing areas 201R. Thus, the barrier 21 allows image light for the left-eye images to reach the left eye 5L and image light for the right-eye images to reach the right eye 5R. More specifically, the open areas 21b allow image light for the left-eye images to reach the left eye 5L of the user 13 and image light for the right-eye images to reach the right eye 5R of the user 13. The 3D display device 17 with this structure can project a parallax image to the two eyes of the user 13.

The user 13 views a parallax image with the left eye 5L and the right eye 5R to view the image stereoscopically. A direction that causes parallax between the two eyes of the user 13 is also referred to as a parallax direction. The parallax direction corresponds to the direction in which the left eye 5L and the right eye 5R of the user 13 are located.

The user 13 having stereoscopic vision may lose stereoscopic vision when the left eye 5L receives image light for the right-eye images or when the right eye 5R receives image light for the left-eye images. A phenomenon in which the left eye 5L receives image light for right-eye images or the right eye 5R receives image light for left-eye images is also referred to as crosstalk. Crosstalk deteriorates the quality of a stereoscopic image provided to the user 13. The barrier 21 functions to prevent image light for the left-eye images from reaching the right eye 5R and image light for the right-eye images from reaching the left eye 5L. More specifically, the light-blocking surfaces 21a prevent image light for the left-eye images from reaching the right eye 5R of the user 13 and image light for the right-eye images from reaching the left eye 5L of the user 13. This structure allows the user 13 to view left-eye images with the left eye 5L alone and right-eye images with the right eye 5R alone. Crosstalk is thus less likely to occur.

Light through the open areas 21b in the barrier 21 is emitted from the display surface 20a of the display 20 as image light and reaches the optical member 15 through the optical element 18. The image light is reflected off the optical member 15 and reaches the eyes 5 of the user 13. This allows the eyes 5 of the user 13 to view a second virtual image 14b located more away in the negative z-direction than the optical member 15. The second virtual image 14b corresponds to the image appearing on the display surface 20a. The open areas 21b and the light-blocking surfaces 21a in the barrier 21 form a first virtual image 14a in front of the optical member 15 and more away in the negative z-direction than the second virtual image 14b. As shown in FIG. 1, the user 13 can view an image with the display 20 appearing to be at the position of the second virtual image 14b and the barrier 21 appearing to be at the position of the first virtual image 14a.

The 3D display device 17 emits image light for the image appearing on the display surface 20a in a direction defined by the barrier 21. The optical element 18 reflects or refracts the image light to direct the light to the optical member 15. The optical member 15 reflects the image light to direct the light to the eyes 5 of the user 13. The image light entering the eyes 5 of the user 13 causes the user 13 to view a parallax image as a virtual image 14. The user 13 views the virtual image 14 stereoscopically. An image corresponding to the parallax image in the virtual image 14 is also referred to as a parallax virtual image. A parallax virtual image is a parallax image projected through the optical system 30. An image corresponding to the planar image in the virtual image 14 is also referred to as a planar virtual image. A planar virtual image is a planar image projected through the optical system 30.

Figure 6:
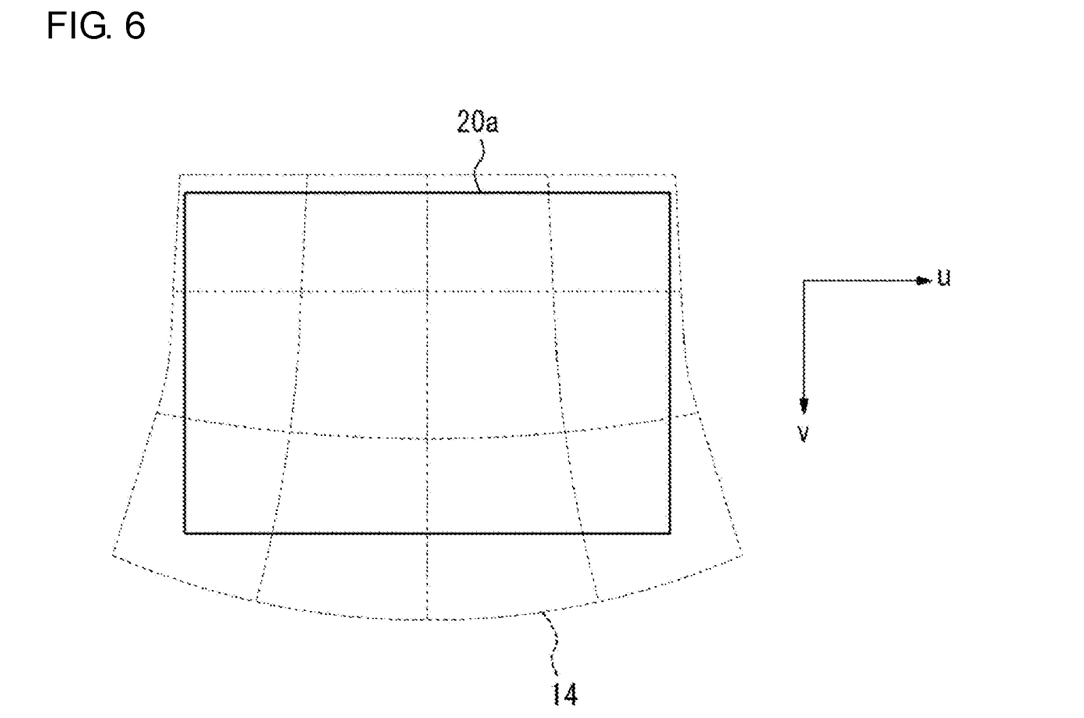
FIG. 6 is a diagram showing example distortion of a virtual image projected through an optical system.

A parallax virtual image viewable by the user 13 is projected to the eyes 5 of the user 13 through the optical system 30. The optical system 30 may be to project an image input with incident image light by enlarging or reducing the image while maintaining the relative similarity of the image. However, the optical system 30 may not maintain the relative similarity between the input image and the image to be projected. More specifically, distortion may occur between a parallax image yet to be input into the optical system 30 and a parallax image (parallax virtual image) projected through the optical system 30. For example, as shown in FIG. 6, a virtual image 14 distorted to be enlarged in u-direction in the positive v-direction may result from projecting an image appearing on the rectangular display surface 20a to the eyes 5 of the user 13 through the optical system 30. The solid lines indicate the shape of the display surface 20a. The broken lines indicate the shape of the virtual image 14.

Figure 7:
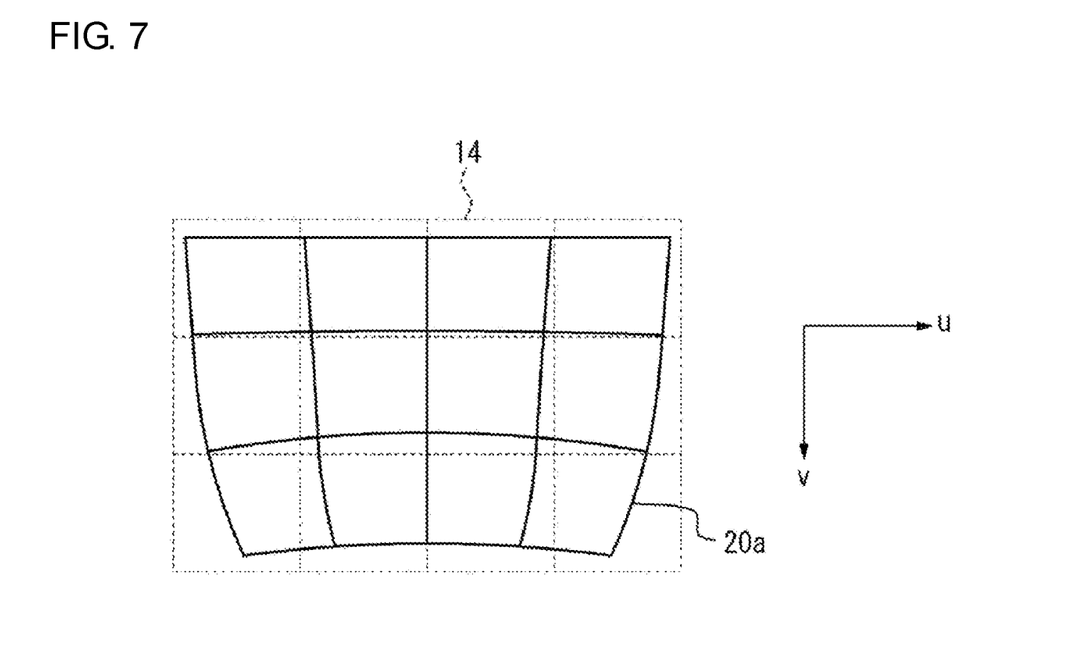
FIG. 7 is a diagram of an example image appearing on the display surface based on inversely transformed distortion in FIG. 6.

When viewed by the left eye 5L and the right eye 5R, the virtual image 14 projected through the optical system 30 can have distortion with respect to the image appearing on the display surface 20a. The controller 24 may control the image appearing on the display surface 20a to allow a virtual image 14 projected through the optical system 30 to be rectangular as shown in FIG. 7. The virtual image 14 is indicated by the broken lines. The display surface 20a for the image indicated by the solid lines is distorted from a rectangle. The display surface 20a has a shape obtained by inversely transforming the rectangular shape to appear as the virtual image 14 with a matrix representing the distortion in the optical system 30. In the example in FIG. 7, when projected through the optical system 30, the display surface 20a has an area in the positive v-direction magnified more in u-direction than an area of the display surface 20a in the negative v-direction. Thus, the controller 24 reduces, in u-direction, a portion of an image appearing in the area in the positive v-direction in the display surface 20a.

Figure 8:
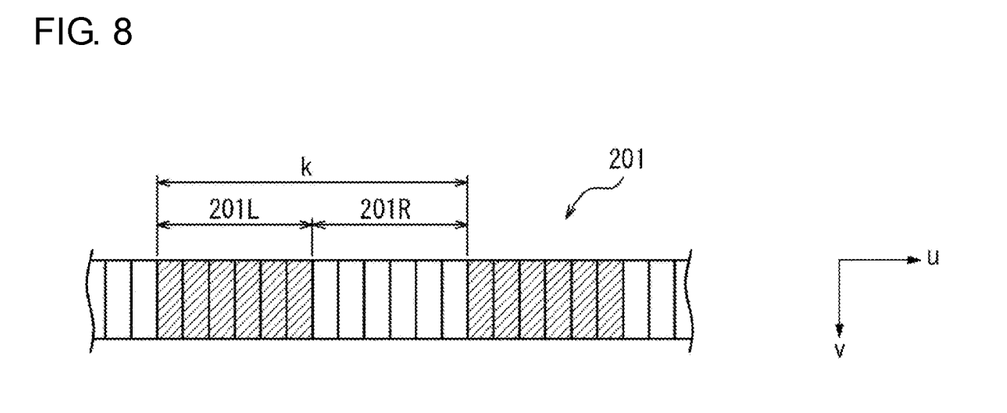
FIG. 8 is a diagram of an example display surface with a minimum repeat unit to allow a user to stereoscopically view an image.

In this example, the user 13 views a virtual image 14 projected through the optical system 30 stereoscopically when the left-eye viewing areas 201L and the right-eye viewing areas 201R appear in the virtual image 14 as in the example in FIG. 8. A left-eye viewing area 201L and a right-eye viewing area 201R occur repeatedly with a pitch k, which is also referred to as a minimum repeat unit. In the example in FIG. 8, the minimum repeat unit corresponds to the length of 12 subpixels 20p that are arranged in u-direction.

Figure 9:
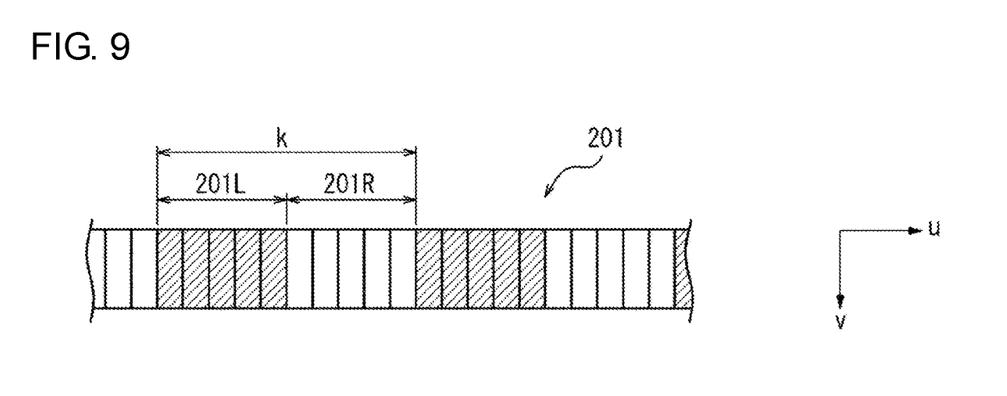
FIG. 9 is a diagram of an example display surface with a minimum repeat unit set to allow a user to stereoscopically view an image magnified by projection through the optical system.

For example, an image appearing on the display surface 20a is magnified 1.2 times in u-direction in a virtual image 14 projected through the optical system 30. In this case, the controller 24 sets the minimum repeat unit to the length of 10 subpixels 20p that are arranged in u-direction as in the example in FIG. 9. This allows the minimum repeat unit in the virtual image 14 to have the length of 12 subpixels 20p, allowing the user 13 to view a stereoscopic image. In other words, the controller 24 sets the minimum repeat unit for the display surface 20a to allow the minimum repeat unit in the virtual image 14 to have the length of 12 subpixels 20p.

Figure 10:
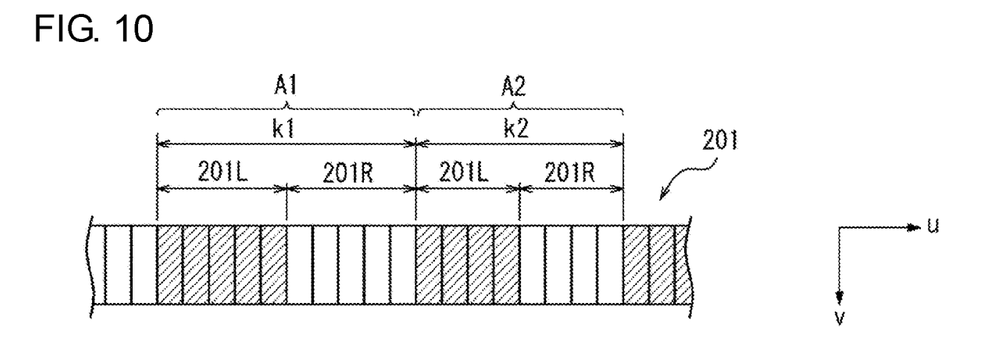
FIG. 10 is a diagram of an example display surface with minimum repeat units changed in u-direction to allow a user to stereoscopically view an image magnified by projection through the optical system.

The magnification of the virtual image 14 in u-direction can change along u-axis. In this case, the controller 24 divides the first display area 201 into multiple subareas in u-direction and sets a minimum repeat unit for each subarea as in the example in FIG. 10. A subarea A1 has a minimum repeat unit k1, which corresponds to the length of 10 subpixels 20p. A subarea A2 has a minimum repeat unit k2, which corresponds to the length of eight subpixels 20p. The controller 24 divides the first display area 201 into subareas and sets a minimum repeat unit for each subarea to allow the virtual image 14 corresponding to the multiple subareas to have a minimum repeat unit corresponding to the length of 12 subpixels 20p. The subareas divided for setting minimum repeat units are also referred to as minimum repeat unit control areas.

Figure 11:
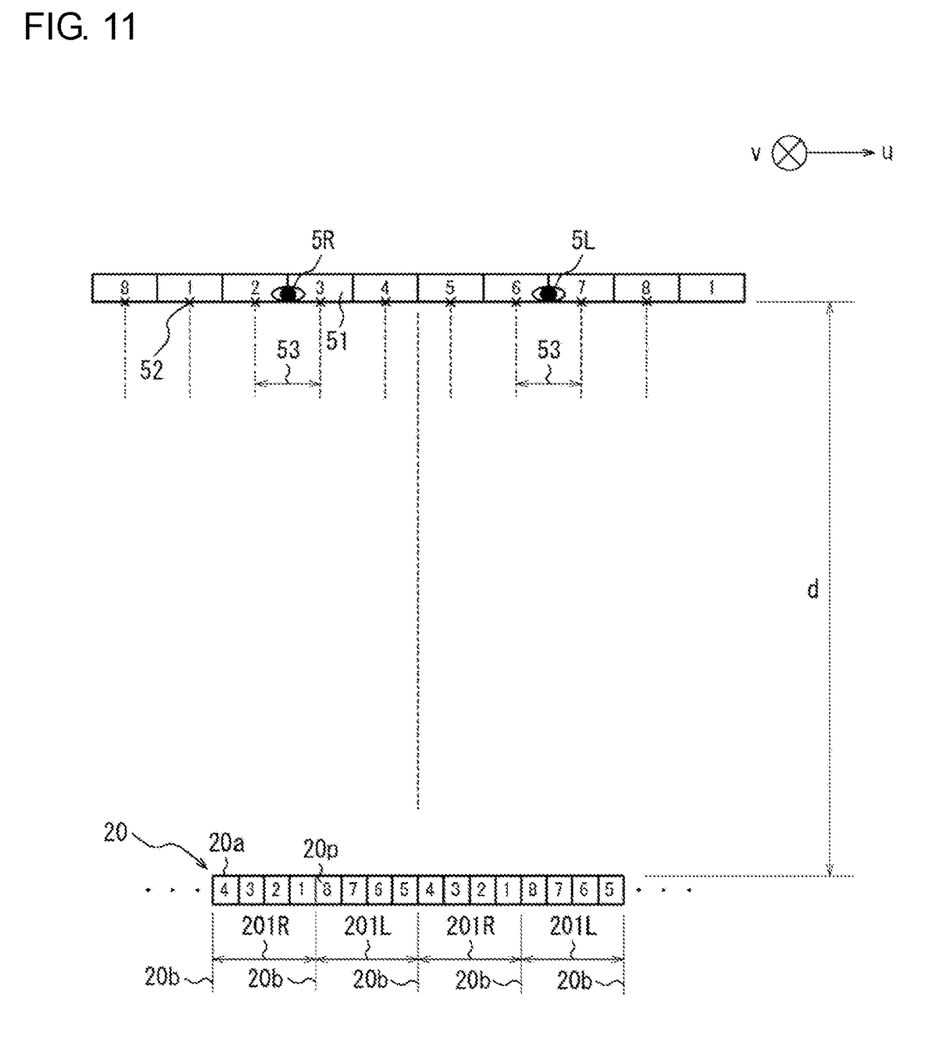
FIG. 11 is a diagram of example dot areas and control areas in an optimum viewing distance plane.

As shown in FIG. 11, the display 20 includes the left-eye viewing areas 201L to display left-eye images and the right-eye viewing areas 201R to display right-eye images. Each left-eye viewing area 201L and its adjacent right-eye viewing area 201R are defined by a display boundary 20b between them, and each include four subpixels 20p that are arranged in u-direction. The eight subpixels 20p are numbered from 1 to 8. The numbering of these subpixels 20p is also referred to as the numbering of subpixels 20p. Each left-eye viewing area 201L includes subpixels 20p numbered from 5 to 8. Each right-eye viewing area 201R includes subpixels 20p numbered from 1 to 4. A set of a left-eye image and a right-eye image appear repeatedly as a unit of eight subpixels 20p. The number of subpixels 20p as left-eye viewing areas 201L is the same as the number of subpixels 20p as right-eye viewing areas 201R. In other words, subpixels 20p may be numbered repeatedly corresponding to double the number of subpixels 20p as left-eye viewing areas 201L or right-eye viewing areas 201R. An each of left-eye viewing areas 201L or a each of right-eye viewing areas 201R may be arranged as certain number of subpixels 20p. The certain number may be three or less, or five or more, instead of being four. A set of a left-eye image and a right-eye image may appear repeatedly double the certain number of subpixels 20p.

In FIG. 11, the barrier 21 is included in the display surface 20a of the display 20. The gap between the display 20 and the barrier 21 is sufficiently shorter than a distance d from the left eye 5L and the right eye 5R to the display surface 20a of the display 20, and is thus negligible. The distance d corresponds to an optimum viewing distance.

At the positions of the left eye 5L and the right eye 5R, areas are virtually defined for the left-eye viewing areas 201L and the right-eye viewing areas 201R on the display surface 20a of the display 20. The areas virtually defined at the positions of the left eye 5L and the right eye 5R are also referred to as dot areas 51. The dot areas 51 are defined in accordance with the interocular distance. In FIG. 11, a left-eye image and a right-eye image appear repeatedly in a set of eight subpixels 20p. In this case, four dot areas 51 are defined for each of the left eye 5L and the right eye 5R. The width of each dot area 51 in u-direction is calculated as ¼ of the interocular distance based on four dot areas 51 defined between the left eye 5L and the right eye 5R. The number of subpixels 20p in the set for a left-eye image and a right-eye image to repeatedly appear is not limited to eight. The number of dot areas 51 defined for each of the left eye 5L and the right eye 5R is not limited to four. The width of each dot area 51 in u-direction is calculated by dividing the interocular distance by the number of dot areas 51 defined for each of the left eye 5L and the right eye 5R.

The dot areas 51 are numbered in correspondence with the numbering of the subpixels 20p. The dot areas 51 shown in FIG. 11 are numbered from 1 to 8. When the right eye 5R is between the dot areas 51 numbered 2 and 3, the subpixels 20p numbered 1, 2, 3, and 4 are included in the right-eye viewing areas 201R for displaying right-eye images. When the left eye 5L is between the dot areas 51 numbered 6 and 7, the subpixels 20p numbered 5, 6, 7, and 8 are included in the left-eye viewing areas 201L for displaying left-eye images. In other words, the dot areas 51 correspond to the numbering of the subpixels 20p in the right-eye viewing areas 201R and the left-eye viewing areas 201L.

Each dot area 51 includes a control boundary 52 indicated by a cross mark (x) defined at the center in u-direction. The control boundaries 52 define control areas 53. When the left eye 5L stays in the same control area 53, the subpixels 20p numbered accordingly remain unchanged in each left-eye viewing area 201L. Similarly, when the right eye 5R stays in the same control area 53, the subpixels 20p numbered accordingly remain unchanged in each right-eye viewing area 201R. When the left eye 5L moves to a different control area 53, the controller 24 causes the subpixels 20p with different numbering to be included in each left-eye viewing area 201L. More specifically, the controller 24 changes the range of each left-eye viewing area 201L. When the right eye 5R moves to a different control area 53, the controller 24 causes the subpixels 20p with different numbering to be included in each right-eye viewing area 201R. More specifically, the controller 24 changes the range of each right-eye viewing area 201R.

For example, the right eye 5R in a control area 53 including a joint between the dot areas 51 numbered 2 and 3 moves to a control area 53 including a joint between the dot areas 51 numbered 3 and 4. In this case, the left eye 5L in a control area 53 including a joint between the dot areas 51 numbered 6 and 7 moves to a control area 53 including a joint between the dot areas 51 numbered 7 and 8. In response to the left eye 5L and the right eye 5R each passing through a control boundary 52, the controller 24 shifts the display boundaries 20b to cause the subpixels 20p with different numbering to be included in each left-eye viewing area 201L and right-eye viewing area 201R. After the display boundaries 20b are shifted, the subpixels 20p numbered 2, 3, 4, and 5 are included in the right-eye viewing areas 201R. The subpixels 20p numbered 6, 7, 8, and 1 are included in the left-eye viewing areas 201L.

The numbering of the subpixels 20p included in each right-eye viewing area 201R can be identified by the numbering of the subpixel 20p located at the end in the positive u-direction. The numbering of the subpixel 20p at the end in the positive u-direction may also be referred to as an index. For example, when a right-eye viewing area 201R includes the subpixels 20p numbered from 1 to 4, the index is 1. The numbering of the subpixels 20p in each left-eye viewing area 201L identified by the numbering of the subpixels 20p in each right-eye viewing area 201R is identifiable by using the indexes. For example, when the index is 1, the numbering of the subpixels 20p in each left-eye viewing area 201L can be identified as 5 to 8.

In FIG. 11, the dot areas 51 and the control areas 53 are line segments drawn to extend in u-direction. The dot areas 51 and the control areas 53 are actually elongated in the direction from and into the page of the figure. In other words, the dot areas 51 and the control areas 53 are on a plane extending in u-direction and v-direction. In FIG. 11, each control boundary 52 is a middle point of a line segment indicating the corresponding dot area 51, and is an end point of a line segment indicating the corresponding control area 53. The control boundaries 52 are also elongated in the direction from and into the page of the figure. In other words, the control boundaries 52 are lines including a component in v-direction.

The left eye 5L and the right eye 5R are at an optimum viewing distance away from the display surface 20a of the display 20. The left eye 5L and the right eye 5R can move in a plane perpendicular to z-direction. A plane at an optimum viewing distance away from the display surface 20a and perpendicular to z-direction is also referred to as an optimum viewing distance plane. The dot areas 51, the control boundaries 52, and the control areas 53 are elongated on the optimum viewing distance plane in the same directions as the edge lines of the open areas 21b in the barrier 21.

When the left eye 5L at the optimum viewing distance away from the display surface 20a views an image without being through the optical system 30, the numbering of the subpixels 20p in each left-eye viewing area 201L is repeated for all the subpixels 20p that are arranged in u-direction.

When the right eye 5R at the optimum viewing distance away from the display surface 20a views an image without being through the optical system 30, the subpixels 20p are numbered in each right-eye viewing area 201R with the same number for all the subpixels 20p that are arranged in u-direction. In other words, all the subpixels 20p arranged in u-direction are numbered with a number identifiable by a single index.

The positional relationship between the barrier 21 and the display surface 20a viewed by the user 13 can change between when the user 13 views the display surface 20a directly and when the user 13 views a virtual image 14 projected through the optical system 30. To enable the user 13 to stereoscopically view a virtual image 14, the controller 24 sets the index for an image to appear on the first display area 201 by calculating inversely from the index in the virtual image 14. The controller 24 may divide the first display area 201 into subareas based on distortion of a virtual image 14 projected through the optical system 30, and set an index for each subarea for the image to appear. The subareas divided for setting indexes are also referred to as index control areas.

The controller 24 can set the minimum repeat unit and the index separately. The controller 24 may further divide the minimum repeat unit control areas into index control areas. The areas obtained by further dividing the minimum repeat unit control areas into index control areas are also referred to as display control areas.

The controller 24 may predetermine the areas to be divided for the optical system 30 and store the definition in the storage 23.

To allow the user 13 to stereoscopically view a parallax image, image elements to be commonly included in the left-eye images and the right-eye images in the parallax image are shifted from each other by a certain distance to appear stereoscopically with a certain depth. The certain distance by which the image elements are shifted is also referred to as a parallax amount. The controller 24 may control the parallax amount for an image to appear on the first display area 201 based on distortion of a virtual image 14 projected through the optical system 30. The parallax amount may be controlled to correspond to the minimum repeat unit. The controller 24 may define a parallax amount for each minimum repeat unit control area. The controller 24 may set a parallax amount for each display control area.

A virtual image 14 with distortion projected through the optical system 30 can have uneven luminance To correct such uneven luminance of the virtual image 14, the controller 24 may control the luminance of an image to appear on the first display area 201. The luminance may be controlled to correspond to the minimum repeat unit. The distribution of magnifications in v-direction can also cause uneven luminance. The controller 24 may further divide the minimum repeat unit control areas based on the distribution of magnifications in v-direction, and control the luminance of the image for each divided area.

The virtual image 14 projected through the optical system 30 may have distortion changeable depending on the positions of the eyes 5 of the user 13. The controller 24 may divide the first display area 201 into minimum repeat unit control areas based on information about the positions of the eyes 5 of the user 13. The controller 24 may divide the first display area 201 into index control areas based on information about the positions of the eyes 5 of the user 13. The controller 24 may predetermine the relationship between the positions of the eyes 5 of the user 13 and the area dividing patterns, and store the relationship in tabular form in the storage 23.

The controller 24 may change the index in response to a change in the positions of the eyes 5 of the user 13. In this case, the controller 24 may change the index alone without changing the area dividing pattern, or may change the area dividing pattern and the index together.

The open areas 21b in the barrier 21 in the virtual image 14 projected through the optical system 30 may be distorted from the shape of the open areas 21b viewed directly by the user 13.

Figure 12:
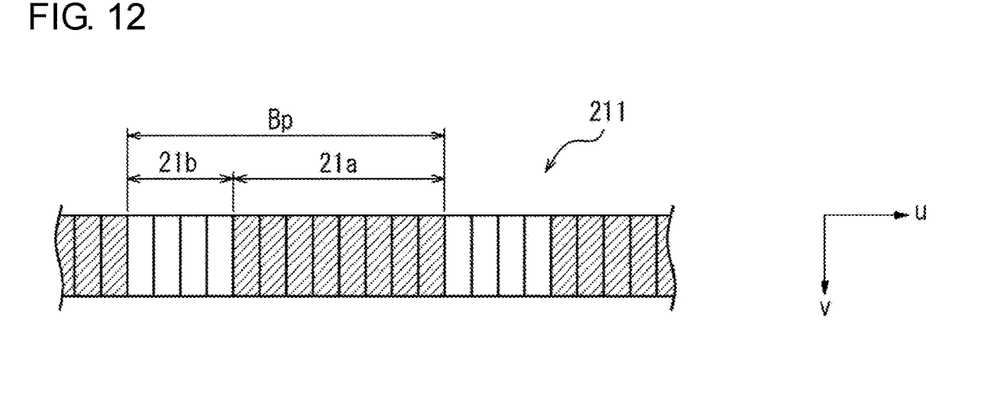
FIG. 12 is a diagram of an example barrier with a barrier pitch to allow a user to stereoscopically view an image.

In this example, the user 13 views a virtual image 14 projected through the optical system 30 stereoscopically when the open areas 21b and the light-blocking surfaces 21a appear in the virtual image 14 as in the example in FIG. 12. An open area 21b and a light-blocking surface 21a repeat with a pitch Bp. The pitch Bp is also referred to as a barrier pitch. In the example in FIG. 12, the barrier pitch corresponds to the length of 12 segments.

Figure 13:
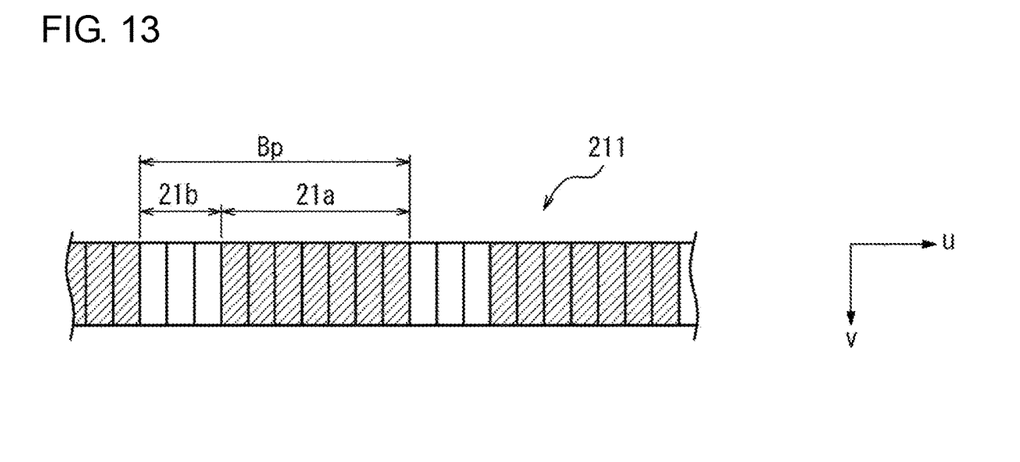
FIG. 13 is a diagram of an example barrier with a barrier pitch determined to allow a user to stereoscopically view an image magnified by projection through the optical system.

For example, the barrier 21 appears to be magnified 1.2 times in u-direction in a virtual image 14 projected through the optical system 30. In this case, the barrier 21 may have a barrier pitch with the length of 10 segments as shown in FIG. 13. This allows the barrier pitch to appear to correspond to the length of 12 segments in the virtual image 14. This allows the user 13 to view a stereoscopic image. In other words, the actual barrier pitch for the barrier 21 may be determined to allow the barrier pitch in the virtual image 14 to have the length of 12 segments.

Figure 14:
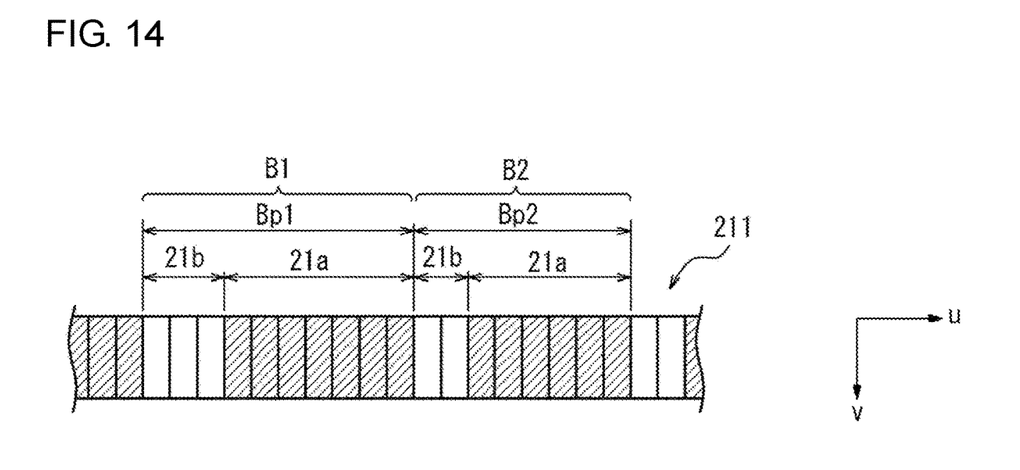
FIG. 14 is a diagram of an example barrier with barrier pitches changed in u-direction to allow a user to stereoscopically view an image magnified by projection through the optical system.

The magnification of the virtual image 14 in u-direction can change along u-axis. In this case, the barrier 21 may have the first barrier area 211 divided into multiple subareas in u-direction, and have different barrier pitches for each subarea. A subarea B1 has a barrier pitch Bp1, which corresponds to the length of 10 segments. A subarea B2 has a barrier pitch Bp2, which corresponds to the length of eight segments. The barrier 21 may include the first barrier area 211 divided into subareas and have a different barrier pitch for each subarea to cause each subarea in the virtual image 14 to appear to have a barrier pitch with the length of 12 segments. The subareas divided for determining barrier pitches are also referred to as barrier pitch control areas.

The virtual image 14 projected through the optical system 30 may have distortion changeable depending on the positions of the eyes 5 of the user 13. In other words, distortion of the virtual image 14 corresponding to the barrier 21 can change depending on the positions of the eyes 5 of the user 13.

The barrier 21 as a fixed barrier may be designed for the eyes 5 of the user 13 located at certain positions. The barrier 21 may be designed based on the average obtained for multiple likely positions of the eyes 5 of the user 13 defined for multiple structures of the barrier 21.

When the barrier 21 is an active barrier, the controller 24 may divide the first barrier area 211 into barrier pitch control areas based on the positions of the eyes 5 of the user 13, and determine a barrier pitch for each barrier pitch control area. The controller 24 may predetermine the relationship between the positions of the eyes 5 of the user 13 and the area dividing patterns, and store the relationship in tabular form in the storage 23.

The controller 24 may shift the open areas 21b in u-direction in response to a change in the positions of the eyes 5 of the user 13. In this case, the controller 24 may change the positions of the open areas 21b alone without changing the area dividing pattern, or may change the area dividing pattern and the positions of the open areas 21b together.

As described above, the 3D projector 12 and the 3D projection system 100 according to the present embodiment correct distortion of a parallax image projected through the optical system 30 with high accuracy. This can improve the quality of a stereoscopic image provided to the user 13.

The structure according to the present embodiment can also be implemented with an image display method. The image display method may include the steps described below.

Step 1: The controller 24 divides the display 20 or the display surface 20a into multiple display control areas based on the degree of distortion of a parallax image projected through the optical system 30.

Step 2: The controller 24 controls the minimum repeat unit and the index for each display control area for the parallax image.

The image display method may be implemented as an image display program executable by a processor.

The structure according to the present disclosure is not limited to the structure described in the above embodiments, but may be modified or altered variously. For example, the functions of the components are reconfigurable unless any contradiction arises. A plurality of components may be combined into a single unit or a single component may be divided into separate units.

The drawings used to describe the structures of one or more embodiments of the present disclosure are schematic and are not drawn to scale relative to the actual size of each component.

In the present disclosure, the first, the second, or others are identifiers for distinguishing the components. The identifiers of the components distinguished with the first, the second, and others in the present disclosure are interchangeable. For example, the first eye can be interchangeable with the second eye. The identifiers are to be interchanged together. The components for which the identifiers are interchanged are also to be distinguished from one another. The identifiers may be eliminated. The components without such identifiers can be distinguished with reference numerals. The identifiers such as the first and the second in the present disclosure alone should not be used to determine the orders of the components or to determine the existence of smaller number identifiers.

In the present disclosure, X-axis, Y-axis, and Z-axis are used for ease of explanation and may be interchangeable with one another. The orthogonal coordinate system including X-axis, Y-axis, and Z-axis is used to describe the structures according to the present disclosure. The positional relationship between the components of the present disclosure is not limited to the orthogonal relationship.

REFERENCE SIGNS LIST 5 eye (5L: left eye, 5R: right eye)
10 movable object
11 detector
12 3D projector (image display module)
13 user
14 virtual image (14a: first virtual image, 14b: second virtual image)
15 optical member
16 eye box
17 3D display device
18 optical element (18a: first mirror, 18b: second mirror)
19 backlight
20 display (20a: display surface, 20b: display boundary, 20p: subpixel)
201 first display area
201L left-eye viewing area
201R right-eye viewing area
202 second display area
21 barrier (21a: light-blocking surface, 21b: open area)
211 first barrier area
212 second barrier area
22 communicator
23 storage
24 controller
30 optical system
51 dot area
52 control boundary
53 control area
100 3D projection system

The invention claimed is:

1. An image display module, comprising:
a display configured to display a parallax image projected to a first eye and a second eye of a user through an optical system;
a barrier configured to cause parallax between the first eye and the second eye by defining a traveling direction of image light for the parallax image; and
a controller configured to control the display,
wherein the controller divides the display into a plurality of display control areas based on a degree of distortion of the parallax image projected through the optical system, and controls, for each of the plurality of display control areas, a minimum repeat unit and an index for the parallax image.

2. The image display module according to claim 1, wherein
the controller controls, for each of the plurality of display control areas, a parallax amount of the parallax image based on the minimum repeat unit.

3. The image display module according to claim 1, wherein
the controller controls, for each of the plurality of display control areas, a luminance of the parallax image based on the minimum repeat unit.

4. The image display module according to claim 1, wherein
the controller is configured to obtain eye position information indicating positions of the first eye and the second eye, and controls the display further based on the eye position information.

5. The image display module according to claim 4, wherein
the controller controls a minimum repeat unit and an index for the parallax image further based on the eye position information.

6. The image display module according to claim 4, wherein
the controller divides the display into a plurality of display control areas further based on the eye position information.

7. The image display module according to claim 1, wherein
the controller divides the barrier into a plurality of barrier control areas based on the degree of distortion of the parallax image projected through the optical system, and controls, for each barrier control area, a barrier pitch for the barrier.

8. An image display system, comprising:
an imaging device configured to detect eye position information indicating positions of a first eye and a second eye of a user; and
an image display module,
wherein the image display module includes
  a display configured to display a parallax image projected to the first eye and the second eye of the user through an optical system,
  a barrier configured to cause parallax between the first eye and the second eye by defining a traveling direction of image light for the parallax image, and
  a controller configured to control the display based on the eye position information, and
the controller divides the display into a plurality of display control areas based on a degree of distortion of the parallax image projected through the optical system, and controls, for each of the plurality of display control areas, a minimum repeat unit and an index for the parallax image.

9. A movable object, comprising:
an image display system including
  an imaging device configured to detect eye position information indicating positions of a first eye and a second eye of a user, and
  an image display module including
    a display configured to display a parallax image projected to the first eye and the second eye of the user through an optical system,
    a barrier configured to cause parallax between the first eye and the second eye by defining a traveling direction of image light for the parallax image, and
    a controller configured to control the display based on the eye position information, the controller being configured to divide the display into a plurality of display control areas based on a degree of distortion of the parallax image projected through the optical system, and to control, for each of the plurality of display control areas, a minimum repeat unit and an index for the parallax image; and
a windshield including a part of the optical system.

10. An image display method, comprising:
dividing, based on a degree of distortion of a parallax image projected to a first eye and a second eye of a user through an optical system, a display for displaying the parallax image into a plurality of display control areas; and
controlling, for each of the plurality of display control areas, a minimum repeat unit and an index for the parallax image.

11. A non-transitory computer-readable medium storing an image display program for causing a processor to perform operations comprising:
dividing, based on a degree of distortion of a parallax image projected to a first eye and a second eye of a user through an optical system, a display for displaying the parallax image into a plurality of display control areas; and
controlling, for each of the plurality of display control areas, a minimum repeat unit and an index for the parallax image.

* * * * *